United States Patent [19]
Easter et al.

[11] Patent Number: 6,013,202
[45] Date of Patent: Jan. 11, 2000

[54] COMPOSITIONS OF MATTER AND ELECTRIC CABLES

[75] Inventors: Mark Richard Easter, Indianapolis, Ind.; Fiona Eleanor Keen, Chester, United Kingdom

[73] Assignee: BICC General UK Cables Limited, Merseyside, United Kingdom

[21] Appl. No.: 09/124,251

[22] Filed: Jul. 29, 1998

[51] Int. Cl.⁷ .............................. H01B 1/06; C08G 63/48; C08K 3/04
[52] U.S. Cl. .......................... 252/511; 524/495; 524/496; 524/504; 524/581; 525/69; 525/70; 525/71; 525/78; 525/80; 525/222; 525/227; 525/228; 428/375
[58] Field of Search ..................... 524/495, 496, 524/504, 581; 525/69, 70, 71, 78, 80, 222, 227, 228; 252/511; 428/375

[56] References Cited

U.S. PATENT DOCUMENTS

| | | | |
|---|---|---|---|
| 3,959,558 | 5/1976 | MacKenzie, Jr. | 428/379 |
| 4,150,193 | 4/1979 | Burns, Jr. | 428/517 |
| 4,226,823 | 10/1980 | Jansson et al. | 264/174 |
| 4,246,023 | 1/1981 | Savov et al. | 75/12 |
| 4,246,142 | 1/1981 | Ongchin | 252/511 |
| 4,412,938 | 11/1983 | Kakizaki et al. | 252/511 |
| 4,493,787 | 1/1985 | Taniguchi et al. | 252/511 |
| 4,993,107 | 2/1991 | Zoni | 15/352 |
| 5,725,650 | 3/1998 | Flenniken et al. | 106/476 |
| 5,747,563 | 5/1998 | Flenniken et al. | 523/215 |
| 5,871,706 | 2/1999 | Whitehouse | 423/449.2 |
| 5,889,117 | 3/1999 | Flenniken | 525/222 |
| 5,905,106 | 5/1999 | Prigent et al. | 524/430 |

*Primary Examiner*—Samuel A. Acquah
*Attorney, Agent, or Firm*—Blank Rome Comisky & McCauley LLP

[57] ABSTRACT

A composition of matter useful for strippable shields for electric power cables comprises:

- a base polymer which is a copolymer of ethylene with a mono-unsaturated ester;
- conductive carbon black in an amount to give the composition an electrical resistivity below 500 $\Omega$m; and
- as adhesion-controlling additive, a copolymer of ethylene with a mono-unsaturated ester containing from 0.5 to 2% by weight of side-chains each of which comprises an inflexible ring structure bonded to a backbone carbon atom of the copolymer with at most five atoms interposed between them.

The compositions have the advantage of being less rubbery than current strippable-screen compositions and can be made successfully with copolymers of lower ester content.

20 Claims, No Drawings

COMPOSITIONS OF MATTER AND ELECTRIC CABLES

FIELD OF THE INVENTION

This invention relates to compositions of matter for use in making electric cables and to cables in which they are used. More particularly, it relates to compositions for use as "semiconducting" dielectric shield (also called core shield, dielectric screen or core screen) materials in power cables with crosslinked polymeric insulation, primarily at "medium" voltages, say from around 10 kV to 75 or perhaps 100 kV.

DESCRIPTION OF RELATED ART

While some customers desire to have polymeric cables in which the dielectric screen is securely bonded to the insulation so that stripping is only possible by use of a cutting tool that removes a little insulation with the shield, because they believe that this minimises risk of electrical breakdown at the interface, others prefer a "strippable" shield with limited adhesion to the insulation so that it can be peeled cleanly away (generally after cutting "tramlines" part-way through its thickness) without removing any insulation. Current strippable screen compositions for use over insulation of crosslinked polyethylene (XLPE) or one of the ethylene copolymer rubbers (EPR or EPDM, the latter incorporating a diene comonomer to provide unsaturation) are usually based on an ethylene/vinyl acetate copolymer (EVA) rendered conductive with an appropriate type and amount of carbon black: the required peel characteristics can be obtained by selecting an EVA with a high enough vinyl acetate content, with or without using a nitrile rubber as an adhesion-adjusting additive. Formulations using these additives (e.g. Ongchin U.S. Pat. Nos. 4,246,023 and 4,246,142, Burns et al European patent 0,420,271B, Kakizaki U.S. Pat. No. 4,412,938 and Jansson U.S. Pat. No. 4,226,823) are expensive proprietary material and in the present applicants' experience do not sufficiently avoid a requirement to use EVA's of relatively high vinyl acetate content to achieve the optimum adhesion level, with the result that all the strippable screen compositions in general commercial use are more rubbery than is desirable.

Many alternative adhesion-adjusting additives have been proposed, for example waxy aliphatic hydrocarbons (Watanabe et al U.S. Pat. No. 4,993,107); low-molecular weight ethylene homopolymers (Burns Jr U.S. Pat. No. 4,150,193); various silicone compounds (Taniguchi U.S. Pat. No. 4,493,787); chlorosulfonated polyethylene, ethylene-propylene rubber, polychloroprene, styrene-butadiene rubber, natural rubber, polyester rubber, and polyurethane rubber (all in Jansson U.S. Pat. No. 4,226,823); but none of these, except paraffin waxes, seems to have found commercial acceptance.

Applicant Easter's International Patent application PCT/GB97/03098 (Publication no WO98/21278) discloses an additive which consists essentially of ethylene and a comonomer having in its molecule at least one carbon-oxygen dipole, said copolymer having a molecular weight less than 20,000 Daltons but a Mettler drop point higher than 30° C., and it is an object of the present invention to provide an alternative to this additive.

SUMMARY OF THE INVENTION

This invention is based on the discovery of another new and unexpected class of adhesion-adjusting additive which surprisingly allows shield compositions to be formulated, if desired, utilizing EVA's of lower vinyl acetate content for a given level of adhesion, and thus to make strippable shields that are less rubbery and thus easier to process than current formulations utilising nitrile rubbers.

The composition of matter in accordance with the invention comprises:

a base polymer which is a copolymer of ethylene with a mono-unsaturated ester;

conductive carbon black in an amount to give the composition an electrical resistivity below 500 $\Omega$m; and as adhesion-controlling additive, a copolymer of ethylene with a mono-unsaturated ester containing from 0.5 to 2% by weight of side-chains each of which comprises an inflexible ring structure bonded to a backbone carbon atom of the copolymer with at most five atoms interposed between them.

As inflexible ring structures may be considered all rings of five or fewer members and six-membered aromatic rings, including (in both cases) condensed ring structures.

We prefer that the inflexible ring structure is bonded directly to the backbone carbon atom, or at least is spaced from it by only one or two atoms. Such interposed atoms, when present, may be carbon atoms or may be or include a heteroatom, especially an oxygen atom.

5-Member rings, especially those with double-bonded coplanar substituents, are preferred. "Polar" ring structures that contain electronegative hetero-atoms, especially O and/or N atoms, in and/or bonded to the ring itself are preferred. Most especially we prefer 5-membered anhydride rings, which can readily be obtained by grafting a preformed ethylene-unsaturated ester copolymer with maleic anhydride or another suitable anhydride.

Other ring structures that can be used include:

1. "simple" aromatic 6-membered (benzene) rings, with or without substituents, and condensed aromatic rings. These may (for example) be directly bonded to the backbone carbon atom by copolymerizing an appropriate vinyl aromatic compound with ethylene and vinyl acetate as the copolymer is formed. Among many vinyl aromatic compounds that may be used in this way are styrene (vinyl benzene) and substituted styrenes, especially methoxy-, ethoxy- and phenoxy-styrenes.

2. epoxy rings, which may be post-grafted into EVA's by grafting glycidyl methacrylate or another suitable reagent with a peroxide in the usual way.

3. sterically-hindered phenolic rings, which can be post-grafted into EVA's by using a variety of source-molecules, some of which are readily available because they are used in the industry as antioxidants, together with a peroxide as graft initiator. Source molecules containing double bonds are especially attractive; these include, for example, N-(4-anilinophenyl) maleimide, 3,5-di-tertiary-butyl 4-hydroxybenzyl acrylate, 3,5-di-tertiary-butyl 4-hydroxyphenyl acrylate, 3,5-dimethyl 4-hydroxybenzyl acrylate, 3-methyl-5-tertiary-butyl 4-hydroxybenzyl acrylate, and 2-(3,5-di-tertiary-butyl 4-hydroxyphenyl) ethyl acrylate. As suitable reagents of the antioxidant class may be mentioned octadecyl-3-(3,5-ditertiarybutyl-4-hydroxyphenyl)propionate, sold under the trademarks Ralox 530 and Irganox 1076; tetrakis [methylene-3-(3',5'-ditertiarybutyl 4-hydroxypheny propionate] methane, sold under the trademarks BNX 1010, Irganox 1010, Lowinox PP35 and Ralox 630; and butylated hydroxytoluene (BHT). These will mostly graft in such a way that one carbon atom is interposed between the phenolic ring and the backbone carbon atom of the polymer.

4. Alternatively, similar ring structures to those identified in item 3, may be grafted using an "antioxidant-peroxide" of the general kind discussed in Sanchez U.S. Pat. No. 5,051,531. We are uncertain of the resulting structure, but suspect that suitably-selected such antioxidant-peroxides will probably graft in such a way that there is one carbon atom and one oxygen atom between the ring structure and the backbone carbon.

While the applicants do not intend to be bound by any theory, it is speculated that the additives of the present invention might function through an almost mechanical effect of the inflexible ring structures tending to inhibit incipient crystallisation by limiting the length of ethylene-ester chain that may be aligned in a potentially crystallising position with a like length of chain; if so, this would have two effects: first to reduce compatibility of the additive with the base polymer and so give the additive a tendency to accumulate at the interface at a higher concentration than in the body of the composition, and second to reduce bonding at the interface.

The invention includes an electric power cable having at least one conductor, insulation selected from the group consisting of cross-linked polyethylene and the ethylene copolymer rubbers, a dielectric shield and a surrounding jacket, said dielectric shield being of the composition specified above.

DESCRIPTION OF THE PREFERRED EMBODIMENTS

Preferably the base polymer is an EVA, but the invention is also applicable for base polymers such as ethylene-ethyl acrylate, ethylene-methyl acrylate and ethylene-methyl methacrylate copolymers and ternary (or higher-order) copolymers containing relatively small amounts of at least one additional monomer. Whereas for prior-art compositions in which the additive is a nitrile rubber, an EVA with a vinyl acetate content of at least 33% and an additive content of about 30% would be recommended for use with crosslinked polyethylene insulation (or an EVA with a vinyl acetate content of 40 if the additive level were only 5%), in the practice of the present invention a vinyl acetate content of about 33% is often satisfactory in terms of adhesion with an additive content of about 5% and this is preferred for giving the composition less rubbery physical properties; similarly for use with insulation based on EPR or EPDM, in the practice of the present invention an EVA content of about 40% is often sufficient and preferred at an additive level about 5%.

The invention does not require alteration to current practice regarding the types and quantity of carbon black to be used, and conventional types and proportions may be used. Preferably the resistivity of the composition is in the range from 0.1 to the maximum of 500 Ωm and preferably between 5 and 100 Ωm.

In the adhesion-adjusting additive, the side-chains are preferably randomly or relatively evenly distributed along the length of the copolymer molecule. Preferably the side-chains contain little or nothing in addition to the ring structure. Ordinary grafting techniques tend to produce a proportion of side-chains containing multiple linked ring structures, and this is acceptable but not thought to be beneficial.

It may be noted that terpolymers of ethylene, vinyl acetate and maleic anhydride with similar overall composition to the preferred additives of the present invention (but with the anhydride rings incorporated in the backbone chain of the polymer and not in side chains) are known and that we have found them wholly ineffective for the purpose of the invention.

The proportion of the adhesion-adjusting additive required naturally varies with its particular ring structure and other characteristics, but will typically be in the range from about 4 to about 40% by weight—preferably about 5–20% with an optimum content for the preferred additives in the region of 15%.

Ethylene copolymer rubbers for use in the cable insulation include conventional EPR and EPDM rubbers, but also include copolymers with higher olefins (such as octene) that have recently become available through the application of "single-site" metallocene catalysts.

EXAMPLES

The compositions tabulated below were made up by the procedure set out after the table, and made up into moulded plaques measuring 150 mm square by 2 mm thick, one face being bonded to an XLPE block of the same dimensions and the two compositions cured together in the press for 20 min at 180° C. Selected compositions only were made up in larger quantities by a similar procedure and dual-extruded under standard commercial conditions for the respective materials onto sample cables with either XLPE or EPR insulation having an external diameter of 20 mm to form a dielectric screen 1.0 mm thick. In each case adhesion was measured by the peel strength tests detailed below. Identification of ingredients also follows after the Table. In the table, numbered Examples are in accordance with the invention; lettered Examples are for comparison.

TABLE

| Example | A | 1 | 2 | 3 | B |
|---|---|---|---|---|---|
| base polymer type | EVA 33 | EVA 33 | EVA 33 | EVA 33 | none |
| base polymer - parts | 33 | 45.5 | 45.5 | 18.0 | — |
| additive type | none | F 242 | F 189 | F 189 | F 189 |
| additive - parts | — | 15 | 15 | 42.5 | 60.5 |
| carbon black - parts | 36 | 37 | 37 | 37 | 37 |
| process aid - parts | 1 | 1 | 1 | 1 | 1 |
| antioxidant - parts | 0.7 | 0.7 | 0.7 | 0.7 | 0.7 |
| peroxide - parts | 0.8 | 0.8 | 0.8 | 0.8 | 0.8 |
| plaque adhesion: | | | | | |
| kN/m | 8.5 | 5.3 | 6.7 | 2.9 | 3.0 |
| lb per ½ inch | 19 | 12 | 15 | 6.6 | 6.7 |
| cable adhesion: | | | | | |
| kN/m | will not | 6.7 | 8.0 | not | not |
| lb per ½ inch | strip | 15 | 18 | tested | tested |

Mixing Procedure

Batches of about 1350 g (3.3 lb) of each composition were made up using a Farrell model BR Banbury mixer with a capacity of 1.57 l. Half the base polymer and half the adhesion-adjusting additive (or for the comparison examples one or the other) were first introduced into the cold Banbury and fluxed at its middle speed setting; the processing aid and antioxidant were added together, followed immediately by the carbon black. The ram was lowered and raised and the remainder of the base polymer and/or adhesion-adjusting additive were added and blending continued until the temperature reached 135° C. (275° F.). The material was discharged and cooled to ambient temperature, and then half of it reintroduced to the cold Banbury, fluxed and the peroxide added, followed immediately by the remainder of the mixture; blending was continued until the temperature reached 110° C. (230° F.) and the mixture discharged and promptly moulded.

Ingredients

EVA 33: ethylene-vinyl acetate copolymer, 33% vinyl acetate content, 43 melt index, sold under the Trademark ELVAX as Elvax 150.

F 242: an ethylene/40% vinyl acetate copolymer post-grafted with around 1% maleic anhydride, sold by DuPont under the designation "Fusabond 242".

F 189: an ethylene/30% vinyl acetate copolymer post-grafted with around 1% maleic anhydride, sold by DuPont under the designation "Fusabond 189".

carbon black: a low surface area medium structure furnace black with a dibutyl phthalate number about 125.

process aid: stearic acid antioxidant: a polymerised dihydroquinoline antioxidant peroxide: dicumyl peroxide.

Adhesion Tests

Plaque samples were tested by cutting completely through the thickness of the layer of the experimental shield composition in parallel lines to define a strip 12.5 mm (½ inch) wide; one end was lifted and turned back 180° to lie along the surface of the portion still adhered, and the force required to peel at a rate of 0.0085 m/s (20 in/min) measured; peel strength was calculated in N/m and pounds per ½ inch.

Cable samples were tested generally in the same way, with the cuts parallel to the cable axis, but the peeling force was applied and measured in a direction at 90° to the surface, instead of 180°. Because of the different preparation and crosslinking routes, as well as this difference in pulling direction, plaque and cable peel strengths are not directly comparable but plaque tests do provide a useful guide in the development process: typically cable peel force will prove to be roughly twice the plaque peel force.

We claim:

1. A composition of matter comprising:

a base polymer which is a copolymer of ethylene with a mono-unsaturated ester;

conductive carbon black in an amount to give the composition an electrical resistivity below 500 Ωm; and as adhesion-controlling additive, a copolymer of ethylene with a mono-unsaturated ester containing from 0.5 to 2% by weight of side-chains each of which comprises an inflexible ring structure bonded to a backbone carbon atom of the copolymer with at most five atoms interposed between them.

2. A composition of matter in accordance with claim 1 in which said inflexible ring structure is selected from the group consisting of rings of five or fewer members and six-membered aromatic rings, including (in both cases) condensed ring structures.

3. A composition of matter in accordance with claim 1 in which said inflexible ring structure is bonded directly to the backbone carbon atom.

4. A composition of matter in accordance with claim 1 in which said inflexible ring structure is spaced from the backbone carbon atom by only one atom.

5. A composition of matter in accordance with claim 1 in which said inflexible ring structure is spaced from the backbone carbon atom by exactly two atoms.

6. A composition of matter in accordance with claim 1 in which said inflexible ring structure is selected from 5-member rings with double-bonded coplanar substituents.

7. A composition of matter in accordance with claim 1 in which said inflexible ring structures contains electronegative hetero-atoms.

8. A composition of matter in accordance with claim 1 in which said inflexible ring structure is a 5-membered anhydride ring.

9. A composition of matter in accordance with claim 1 in which said base polymer is an EVA.

10. A composition of matter in accordance with claim 1 in which said base polymer is selected from the group consisting of ethylene-ethyl acrylate, ethylene-methyl acrylate and ethylene-methyl methacrylate copolymers and ternary (or higher-order) copolymers containing relatively small amounts of at least one additional monomer.

11. A composition of matter in accordance with claim 1 in which said adhesion-controlling additive forms from about 4 to about 40% by weight of the composition.

12. A composition of matter in accordance with claim 1 in which said adhesion-controlling additive forms from about 5 to about 20% by weight of the composition.

13. A composition of matter in accordance with claim 1 in which said adhesion-controlling additive forms about 15% by weight of the composition.

14. An electric power cable having at least one conductor, insulation selected from the group consisting of cross-linked polyethylene and the ethylene copolymer rubbers, a dielectric shield and a surrounding protective layer, said dielectric shield comprising:

a base polymer which is a copolymer of ethylene with a mono-unsaturated ester;

conductive carbon black in an amount to give the composition an electrical resistivity below 500 Ωm; and as adhesion-controlling additive, a copolymer of ethylene with a mono-unsaturated ester containing from 0.5 to 2% by weight of side-chains each of which comprises an inflexible ring structure bonded to a backbone carbon atom of the copolymer with at most five atoms interposed between them.

15. A cable in accordance with claim 14 in which said inflexible ring structure is bonded directly to the backbone carbon atom.

16. A cable in accordance with claim 14 in which said inflexible ring structure is selected from 5-member rings with double-bonded coplanar substituents.

17. A cable in accordance with claim 14 in which said inflexible ring structure is a 5-membered anhydride ring.

18. A cable in accordance with claim 14 in which said adhesion-controlling additive forms from about 4 to about 40% by weight of the composition.

19. A cable in accordance with claim 14 in which said adhesion-controlling additive forms from about 5 to about 20% by weight of the composition.

20. A cable in accordance with claim 14 in which said adhesion-controlling additive forms about 15% by weight of the composition.

* * * * *